United States Patent [19]

Henley

[11] Patent Number: 5,402,603
[45] Date of Patent: Apr. 4, 1995

[54] FLAPPER PLATE DETONATION FLAME ARRESTER

[76] Inventor: Robert L. Henley, 2057 Parasol, Lexington, Ky. 40513

[21] Appl. No.: 104,377

[22] Filed: Aug. 9, 1993

Related U.S. Application Data

[63] Continuation-in-part of Ser. No. 816,567, Jan. 3, 1992, abandoned.

[51] Int. Cl.$^6$ ............................................. F17D 3/00
[52] U.S. Cl. ...................................... 48/192; 48/190; 137/75; 137/76; 431/346; 431/21; 251/298
[58] Field of Search .................................. 48/190–192, 48/194; 431/346, 21; 137/75, 74, 512.1, 76; 251/298, 303

[56] References Cited

U.S. PATENT DOCUMENTS

| | | | |
|---|---|---|---|
| 2,420,599 | 5/1947 | Jurs | 48/192 |
| 2,990,842 | 7/1961 | Good | 137/202 |
| 3,535,066 | 10/1970 | Wagner | 48/192 |
| 3,689,239 | 9/1972 | Eriksson | 48/192 |
| 3,807,444 | 4/1974 | Fortune | 137/512.1 |
| 3,923,475 | 12/1975 | Stanzel et al. | 48/192 |
| 4,251,226 | 2/1981 | Nishikawa | 48/192 |
| 4,628,954 | 12/1986 | Dayus | 137/75 |
| 4,858,517 | 8/1989 | Coker | 137/75 |
| 4,909,730 | 3/1990 | Roussakis et al. | 431/346 |
| 4,936,287 | 6/1990 | Hart et al. | 137/75 |
| 5,014,463 | 5/1991 | Barbier | 49/401 |

OTHER PUBLICATIONS

Blast Valves–Unnecessary Expense or Vital Components in Structure Hardening, Ann-Sofie L. E. Forsberg, presented Apr. 22–26, 1991, publ. date unknown.
Mitigation of Explosion Hazards of Marine Vapor Control Systems, Final Report, SWRI Proj. No. 06–4116, R. E. White and C. J. Oswald, Oct. 1992.
Proceedings of the Sixth Annual Symposium on Interaction of Nonnuclear Munition with Structures, May 3–7, 1993, Superfluous Investment?, J. Hasler, pp. 74–79.
Blast Closure System Evaluation, Final Report, Contract No. DACA 87-84-D-0033, M. Whitney et al., Sep. 1984.

Primary Examiner—Robert J. Warden
Assistant Examiner—Hien Tran
Attorney, Agent, or Firm—Laurence R. Letson

[57] ABSTRACT

A detonation flame arrester device including a left and right housing assembly containing two flapper plates positioned one in either side of the housing assembly and separated by a channeled barrier in the form of a stacked plate flame arrester designed to allow vapor passage under normal non-activated conditions. The flapper plates are positioned at an angle to be forced shut in advance of a detonation or deflagration wave coming from either direction and propagating through a piping system. The flapper plate is activated by the action of the pressure front on the flapper plate, and each plate is of a size and shape to cover the entire cross sectional area of the housing assembly. The flapper plates can optionally be slammed shut by torsion springs activated through alternate activation devices. Alternate activation devices include: fusible links which would release the torsion spring and shut the flapper plate upon exposure to excessive heat; flotation release devices which would activate the torsion spring and shut the flapper plate upon presence of sufficient liquid within the housing assembly; and external movement activation devices which would swivel float weight releasing torsion springs and activating flapper plates. Activation of either or both plates can be detected by an activation indicator connected to appropriate alarms and/or safety shutdown mechanisms of the protected piping system.

11 Claims, 4 Drawing Sheets

FLAPPER PLATE DETONATION FLAME ARRESTER

CROSS-REFERENCE TO RELATED APPLICATIONS

This application is a continuation in part of U.S. patent application Ser. No. 07/816,567, filed Jan. 3, 1992, now abandoned, entitled Flapper Plate Detonation Flame Arrester.

FIELD OF THE INVENTION

This invention is an inline detonation flame arrester, specifically designed to protect systems containing vapors of flammable or combustible gases or liquids by preventing the transmission of a detonation and/or deflagration through piping systems.

BACKGROUND OF THE INVENTION

For the last fifteen years, concerns about the potential explosion hazards inherent in connecting transportation vessels (marine, truck, rail cars, etc.) and fixed storage facilities have delayed the establishment of regulations limiting hydrocarbon emissions during hydrocarbon transfer operations. However, the Clean Air Act Amendment of 1990 and local regulators are requiring early installation dates for vapor control systems in several jurisdictions. The U.S. Coast Guard is adopting new regulations for the safe design, installation, and operations of marine vapor control systems. These regulations have been promulgated in the belief that the result will be fewer vessels and facilities damaged from fire and explosion, overfilling, and over or under pressurization; fewer injuries and deaths from fire and explosions; and less oil spilled. There continues to be considerable controversy as to the effectiveness of existing detonation flame arresters in these applications. Heretofore, detonation arresters of the crimp ribbon spiral wound type have thus far been subject to test protocol set out by the U.S. Coast Guard (1990). A quick closing flame barrier valve and suppressant has also been tested to investigate the feasibility of an open pipe alternative for detonation arresters. According to the Federal Register, Vol. 55 No. 120, Jun. 21, 1990, the U.S. Coast Guard published test protocol for devices to accomplish the above. Recent tests conducted by industry suggest that there is no such thing as an "all purpose" arrester that works under all possible conditions actually attainable in marine vapor recovery systems. The main obstacle has been an inability to stop the impulse momentum of the detonation or deflagration. It has been demonstrated that automatic shutdown devices cannot react fast enough to isolate the system once a detonation wave has developed. While blowout disks are not prohibited, these alone are not adequate since the flame front will continue despite elimination of the pressure wave.

Based on information conveyed by researchers, it is the consensus of those who have observed numerous tests that the above mentioned devices do not reliably work in this application. Although some success has been achieved in arresting detonation shock waves, mechanical failure of this equipment has persisted. This has led to promulgation of regulations requiring three-phase protection for marine vapor recovery systems to reduce the probability of fire and explosions being conveyed between ship and shore. This three-phase protection includes: 1) controlling the vapor mixture outside of its flammable range; 2) engineering controls to eliminate sources of ignition; and, 3) mechanical detonation arresters. If a reliable detonation arrester can be developed, the all encompassing nature of these regulations might be relaxed, saving industry considerable operating cost and improving operating safety.

OBJECTS AND ADVANTAGES

The flapper plate detonation flame arrester will insert a solid plate in the path of the impulse momentum (shock wave), transferring all of the remaining momentum flow to the flapper plate. The flapper plate is constructed of suitable material to absorb the momentum flow from a detonation or deflagration. The flapper plate can be activated by the pressure wave from the flame front.

An object of the flapper plate device is to stop flame fronts, but it will also substantially stop the pressure wave associated with both detonations and deflagrations inside piping systems. The use of a stacked plate flame arrester as a channeled reinforcing barrier will serve as a near-solid face for the flapper plate, stopping the detonation pressure wave.

Another object of the invention is the offered protection from the pressure wave by the flapper plate to allow an inline flame arrester to be constructed of less expensive and better suited materials such as brass, aluminum, or other suitable materials. Such flame arresters are currently constructed of steel or stainless steel in an attempt to absorb the pressure front, as well as stop the flame. These devices are known to suffer brittle failure.

A further object of the invention is to increase the cross sectional area of the flame arrester thereby improving vapor/gas flow through the device and increasing the span of time between required maintenance to unclog flame arrester elements.

A still further object of the invention is to shut down the piping system before the flame arrester elements fail, by means of fusible links attached to a spring mechanism that will cause the flapper plate to slam shut. Therefore, even though the flame arrester elements may be constructed of aluminum or other low melting point materials, when this safety device activates, all gas flow will stop. This means that flame stabilization will soon stop due to loss of fuel or oxygen or both.

Still another object of the invention is to activate the flapper closure when the vapor lines become partially filled with a liquid, thus providing an emergency shut down for vapor recovery systems and other applications.

An additional object of the invention is to respond to external movement of the flapper plate flame arrester from such occurrences as earthquake or explosion, tripping the torsion spring activation device and thereby activating the flapper plate, shutting down the system in such an emergency.

DESCRIPTION OF THE PREFERRED EMBODIMENT

Figure 1:
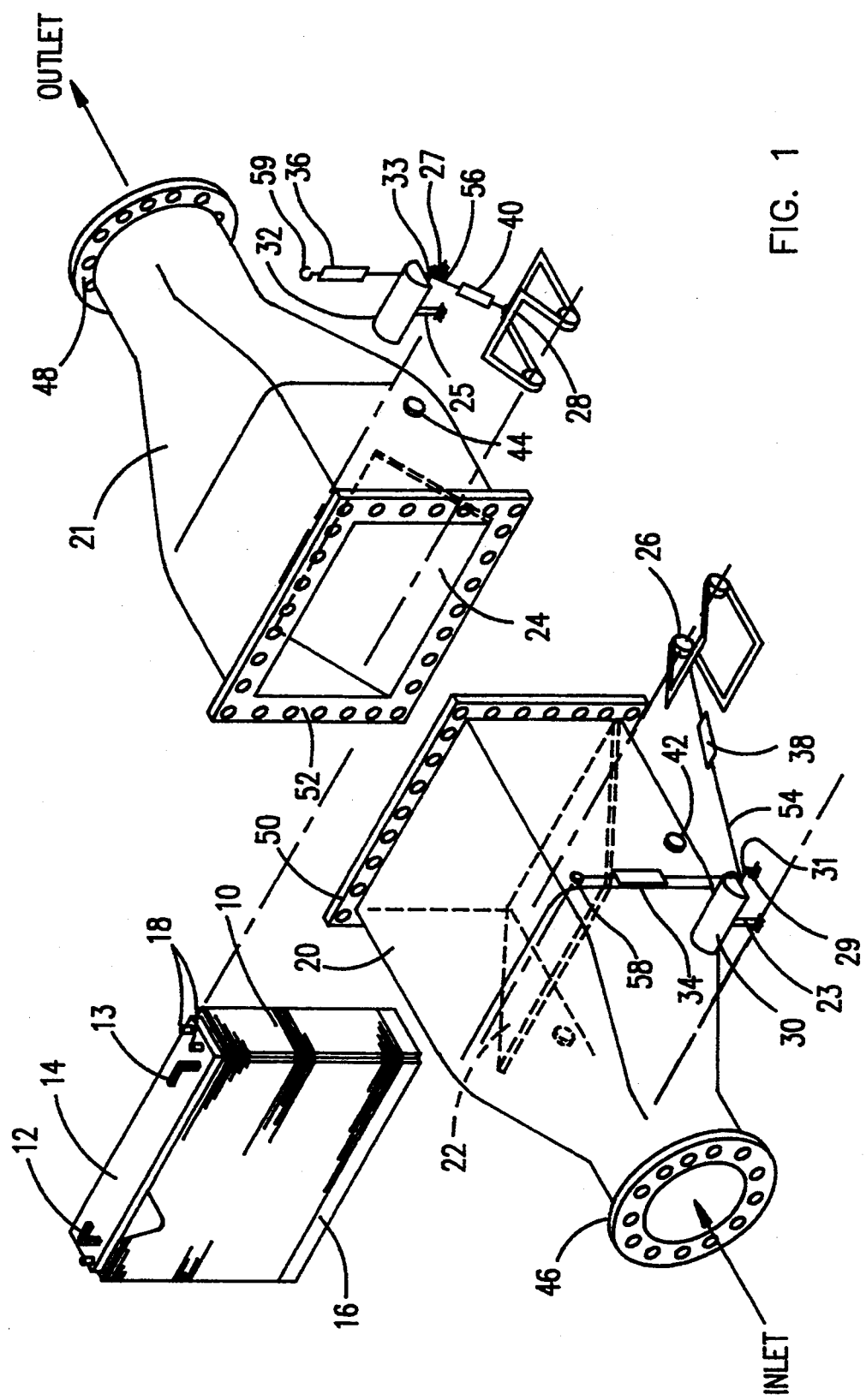
FIG. 1 illustrates an exploded perspective view of the flapper plate detonation flame arrester with the flapper plate activation mechanism removed from within the arrester housing for illustration.

Referring to FIG. 1, reference numerals 46 and 48 illustrate schedule 40 bore piping flange assemblies for class 150, ANSI B16.5 bolting material. The left flange assembly is attached to the left housing structure 20 and is pressure rated for 150 PSIG and pressure tested to 350 PSIG, or greater. The housing is fabricated to ASME boiler and pressure vessel code (2) section VIII, division (1) section IX for welding and brazing qualifications, or cast of ferric ductile cast iron (in accordance with ASTM A395) pressure rating casting for use at elevated temperatures. The left flange assembly 50 and right flange assembly 52 are designed for ANSI B16.5 bolting materials (gas tight). Other embodiments may include a spacer ring. The left housing assembly is equipped with two ¾ inch drain plugs 42 at the base of each vertical side. Similarly, the right housing assembly is equipped with two ¾ inch drain plugs 44 (1 of 2) at the base of each vertical side.

In the preferred embodiment, these assemblies are bolted to either side of a channeled reinforcing barrier 10 optimally constructed as a stacked plate flame arrester. The stacked plate flame arrester is prior art, and while its presence is desirable in this protection system, it is not required that the channeled reinforcing barrier be embodied as a stacked plate flame arrester in order for the invention to function as a detonation arrester. In the preferred embodiment, the stacked plate flame arrester has a maximum experimental safe gap (MESG) below 0.9 millimeters and is constructed of aluminum or other suitable material.

A channeled reinforcing barrier 10 consists of a top grooved cover plate 14 and a bottom grooved dam plate 16 and multiple stacked plates with spacers between each, and is fastened together using extended assembly bolts 18. A left 12 and right 13 activation indicator are provided by means of two oversized plates each attached to a shaft which extends above the top grooved cover plate forming a trigger lever. This lever can be used to activate an instrument signaling device. The channeled reinforcing barrier has grooves around the edges which fit inside the flange assemblies 50 and 52. However, other embodiments may use other suitable flame arresters constructed of steel or its alloys, with or without grooves, in this position, or other reinforcing grid, or none at all.

The left flapper plate 22 and right flapper plate 24 are each positioned at an angle such that a combustion shock wave coming down the pipe from the left or right side and into the housing structure will slam shut in the path of the shock wave momentum flow the flapper plate on the same side as that from which the shock wave approaches, thus protecting the flame arrester.

In the preferred embodiments, the left torsion spring 26 and right torsion spring 28 are positioned beneath the flapper plates maintaining the proper angle for flapper plate activation. In other embodiments, there may be one spring, multiple springs, no spring at all, or counter weight mechanisms to accomplish the same results, or proper flapper plate position may be maintained by other means. If these torsion springs are provided, they can form part of a flame suppression system and/or a liquid stop-flow system. The left torsion spring 26 is held in position by the left spring restraining wire 54 and is equipped with upper fusible link 34 and lower fusible link 38. The right torsion spring 28 is similarly held in position by the right spring restraining wire 56 and is equipped with upper fusible link 36 and lower fusible link 40. The left top tie hook 58 is attached to the interior of left housing structure 20 by any conventional attaching technique such as bolting, clamping or welding. Similarly, the right top tie hook 59 is attached to the interior of the right housing structure 21. The left spring restraining wire 54 passes through a left notched moment arm 31 which is held in position by the left float weight release mechanism 30.

Figure 2:
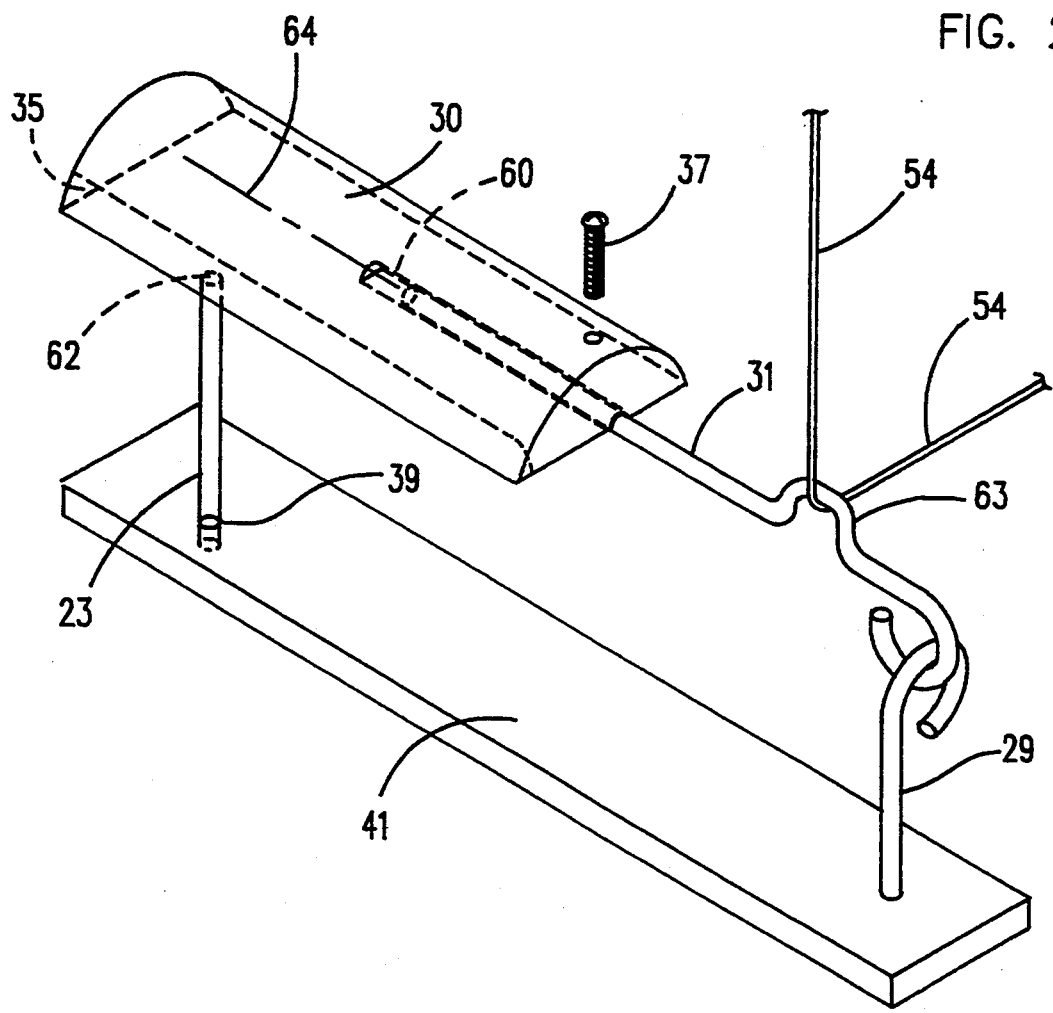
FIG. 2 is a perspective view of the float weight release mechanism.

Referring to FIG. 2, the float weight release mechanism is shown isolated from the flame arrester assembly of FIG. 1 for clarity.

The float weight 30 is typically constructed as a sealed hollow body of rigid material such as sheet brass or thin stainless steel, so as to retain its shape and to form a buoyant float partially submersible in a liquid. The float is provided with a groove 60 on its underside. Further, the float 30 is provided with a pivot leg 23. The pivot leg 23 is preferably attached, as by soldering or welding to the underside of float 30. The attachment point where the pivot leg 23 and float 30 are connected is preferably located such that the center of gravity of float 20 is located between the attachment point 62 of leg 23 to float 30 and the end of the float 30 which is closest to the groove 60. Further, the attachment point 62 of leg 23 to float 30 is displaced from the longitudinal centerline 64 of the bottom surface of the float 30, such that the center of gravity of the float 30 is not located above either the attachment point 62 or the longitudinal axis of the bottom surface of the float 30.

To provide a mounting for the float weight mechanism of FIG. 2, a plate 41 is supplied. Plate 41 may be attached to the interior bottom of the housing 20, by any conventional means, such as welding or bolting. The plate 41 is further provided with a hole 39 to receive pivot leg 23. Pivot leg 23 is sized to be slightly smaller than hole 39 to permit pivot leg 23 to be freely inserted into hole 39 and still be held generally co-axial relative to the hole 39. The interference of leg 23 and hole 39 will keep leg 23 from falling over and will thus support leg 23 and float weight 30. One end of notched moment arm 31 is pivotally supported by hinged post 29 at a height approximately the height of the bottom of float weight 30 above plate 41. The notched moment arm 31 is provided with a notch 63 which constrains the spring wire 54 from undue movement along the axis of moment arm 31 and defines a moment arm distance of predictable length through which wire 54 may exert forces.

Resistance to movement of the moment arm is provided by a groove 60 formed in the float weight 30. The float weight 30 resists the generally upward movement of notched moment arm 31 and as long as the float weight 30 is undisturbed and will prevent the release of wire 54. Due to the relative lengths of the moment arm distances of the wire exerted force and the float weight exerted restraining force the weight may be light while exerting a sufficiently large force against the wire to retain the spring 26 in a retracted position.

Should the housing 20 accumulate sufficient liquid to float the float weight 30 enough to disengage the leg 23 from hole 39, the stability of the float weight 30 will be sufficiently degraded by the rotation of the float weight 30 due to the force couples created by the center of gravity being displaced from the force exerted by the notched moment arm 31, as to no longer reliably hold the end of the notched moment arm 31 against the forces of wire 54 and the spring 26 will be free to actuate the plate 22. The rotation of the float weight 30 may be enhanced when buoyant by providing an additional weight 35 positioned along one longitudinal edge of the float weight 30. This off-center weight 35 will cause the float weight 30 to rotate when the float weight 30 becomes buoyant.

The balance of forces between float weight 30 and notched moment arm 31 may be delicately designed and adjusted so that a small force can disturb this balance and release the wire 54. To make the force balance adjustable, a screw 37 may be threadedly engaged with and through the float weight 30 and project into the groove 60. By extending the screw 37 farther into the groove the notched moment arm 31 is partially forced out of engagement with the groove, lessening the restraining force thereon. Such a small force may be an inertial force of the float weight 30, if and when the flame arrester of FIG. 1 is moved, such as by an earthquake or an explosion nearby which jolts or disturbs the position of the flame arrester. If the flame arrester of FIG. 1 is moved such as by an earthquake or explosion, the inertia of the float weight 30 will tend to maintain the float weight 30 stationary while the housing 20 is moved. This movement will destroy the delicate balance of the float weight 30 and the notched moment arm 31, releasing the wire 54. An identical mechanism may be installed in housing 21 to activate plate 24 under similar circumstances.

The operating conditions of the system within which the instant flame arrester would be installed would be an internal pressure of not more than 16 psig and a flow velocity of about 10 feet per second. The normal flow and pressure conditions would not be sufficient to force the flapper plates 22, 24 to a closed position. However, the flow of the vapors and air mixture from the piping attached to flange 46 will inherently create turbulence within the chamber of housing structure 20, which will to some extent impede the flow of the vapors and air, particularly since plate 22 extends into the flow path.

Figure 3:
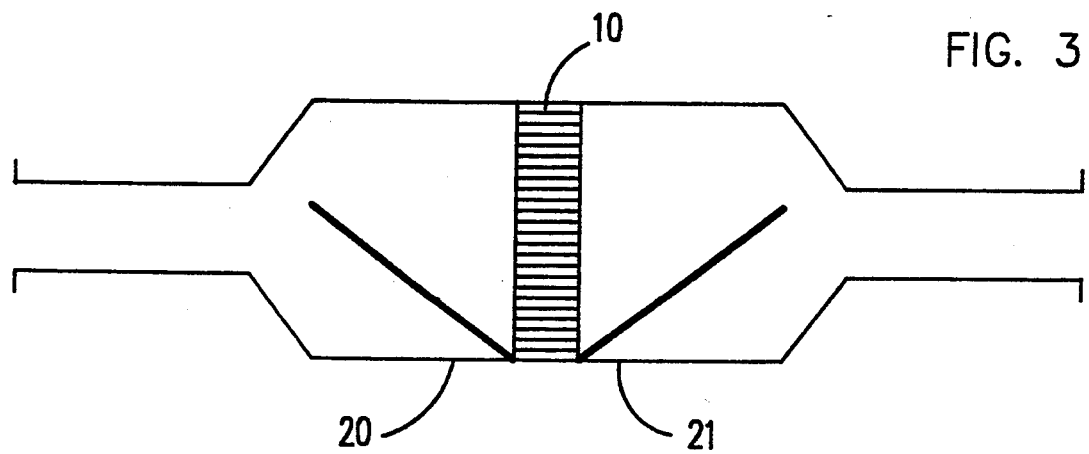
FIG. 3 is a schematic side section view of an arrester having a preferred form of elements comprising a stack of metal sheets forming the flame arrester, with two flapper plates, each independent of the other, positioned at an angle to be forced shut bottom to top by a propagating deflagration or detonation wave.

FIG. 3 illustrates a flame arrester similar to the flame arrester of FIG. 1 in a side sectional view.

Figure 4:
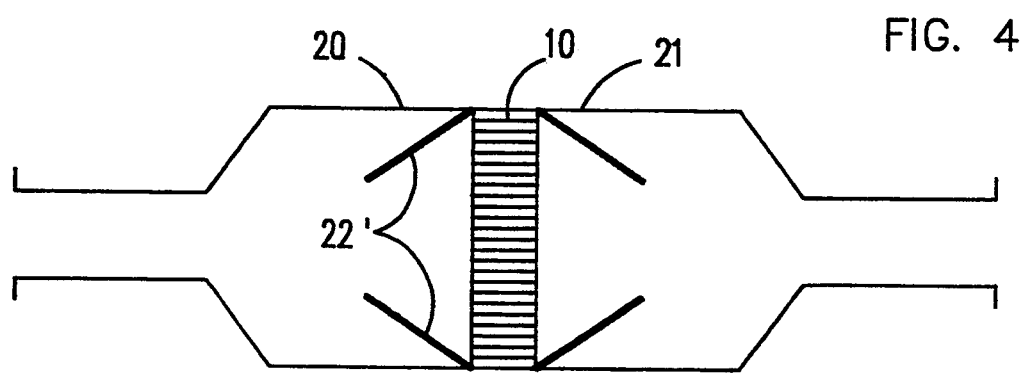
FIG. 4 is a schematic top section view of a preferred form with two independent flapper plates on either side of the stacked plate flame arrester to be forced shut from both sides toward the middle of the housing.

FIG. 4 shows how the flame arrester with two flapper plates 22' on each side of the flame arrester barrier 10 is arranged.

Figure 5:
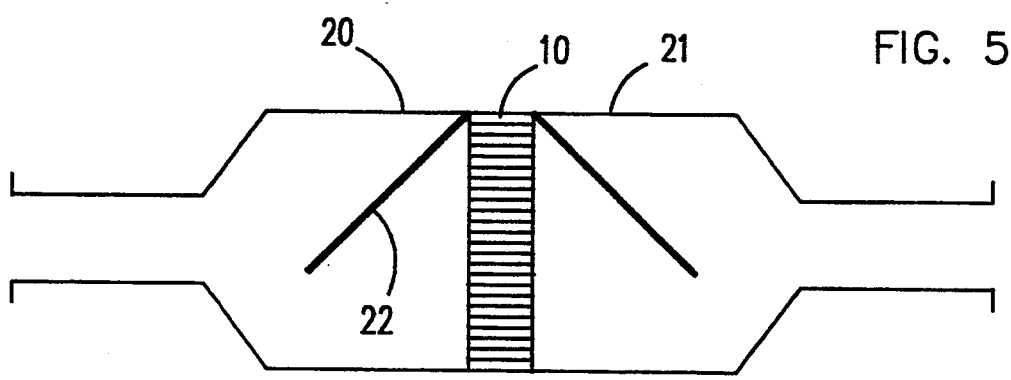
FIG. 5 is a schematic top section view of the preferred form with a single flapper plate on either side of the stacked plate flame arrester positioned to be forced shut side to side, pivoting about a vertical pivot axis.
Figure 6:
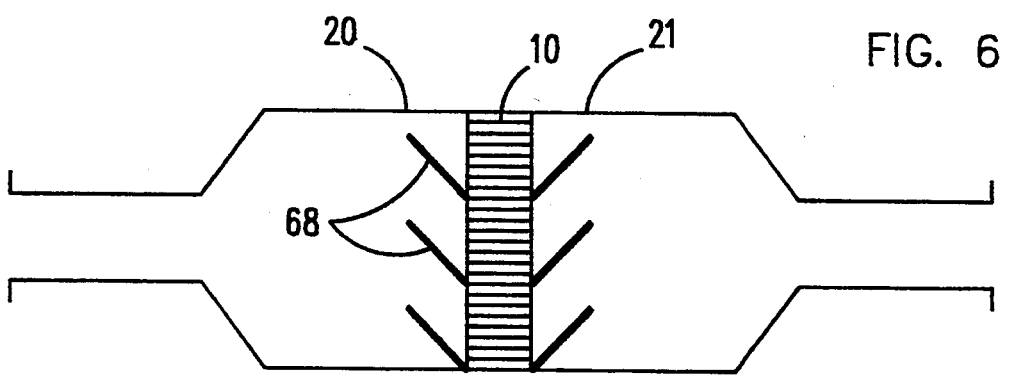
FIG. 6 is a schematic side section view of the preferred form with multiple flapper plates in a louver form on either side of the stacked plate flame arrester positioned to be forced shut by the action of a pressure front.

FIG. 5 shows a top view of side swinging flapper plates 22. Referring to FIG. 6, a multiple louver type arrangement of flapper plate 68 is positioned adjacent to the flame arrester barrier 10. All the flapper plates 22, 22', 68 are pressure wave responsive in that the normal flow will not close the plates, but a detonation pressure wave or a deflagration flame front and the associated pressure wave will cause the flapper plates to pivot to a closed position against the flame arrester barrier 10.

Figure 7:
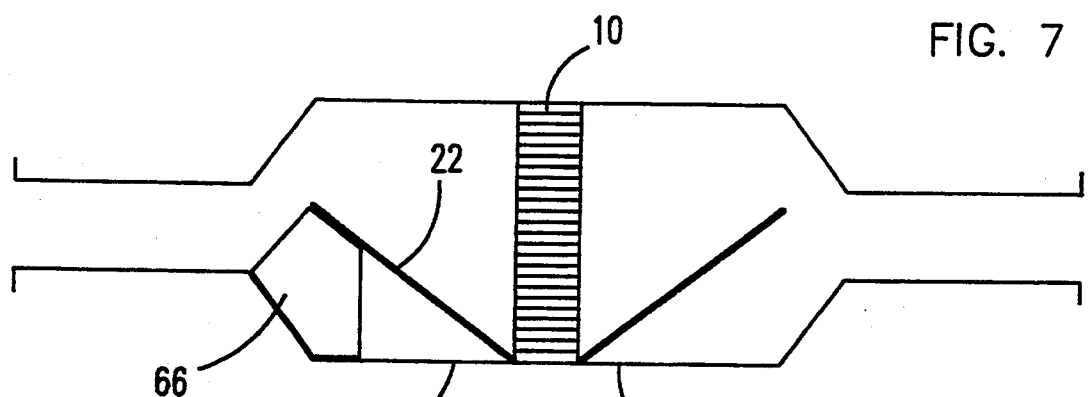
FIGS. 7 through 9 illustrate the flame arresters of FIGS. 3 through 6 having turbulence suppressors mounted to enhance the flow.
Figure 8:
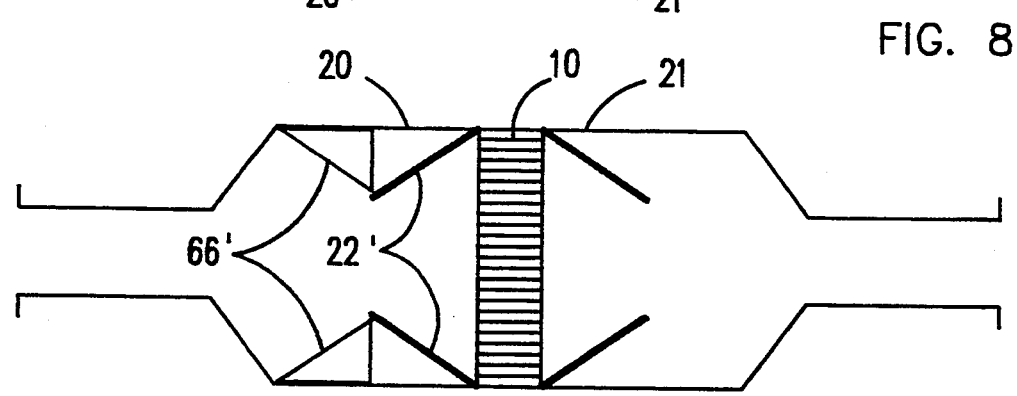
Figure 9:
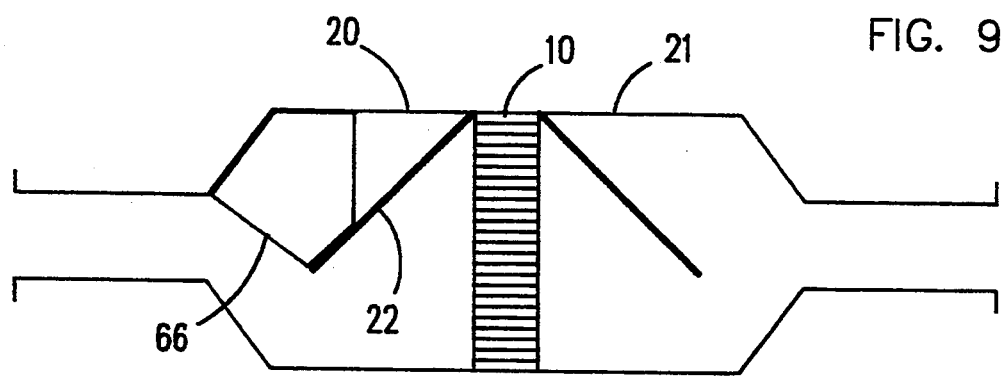

Referring to FIGS. 7 through 9, there are baffles illustrated in the housing 20. In FIG. 7 the baffle 66 is placed in the inlet housing structure 20 and positioned to block the flow of vapors and air to the underside of flapper plate 22, thereby eliminating or greatly reducing the turbulence in the flow. The baffle is constructed as a hollow insert shaped to conform to the interior portion of the housing 20 and having a buckling strength in excess of the forces exerted on the baffle 66 by the flow of the vapor and air mixture within the system. The baffle may be fabricated of a weak collapsible plastic sheet material having just enough strength to withstand the flow forces.

In the event of a deflagration or explosion within the piping system attached to flange 46, the pressure of the pressure wave associated with the explosion or deflagration will be sufficient to collapse the baffle 66 and expose the upstream side of plate 22 to allow the pressure wave to act on the upstream side of plate 22, forcing it to a closed position.

FIG. 8 illustrates the flame arrester of FIG. 4 with baffles 66' installed to reduce the turbulence in the flow within the flame arrester having two flapper plates 22' on the upstream side of the flame arrester.

FIG. 9 illustrates the flame arrester of FIG. 5 with a baffle 66 substantially the same as that of FIG. 7 installed where the flapper plate 22 is pivotable about an axis of rotation which is vertically oriented.

Figure 10:
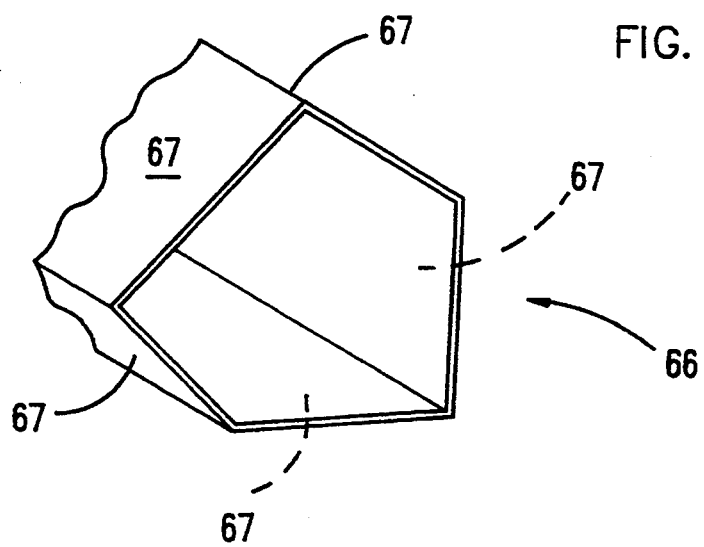
FIG. 10 is a perspective illustration of a baffle insertable into the flame arrester to reduce turbulence.

Referring to FIG. 10, the baffle 66 is formed into a hollow polygonal tube having flat faces 67. The flat faces all lie transverse to the axis of flow within the system and the flame arrester. The baffle may be formed into a triangular cross sectional tube as in FIG. 8. The ends of the tube faces 67 all may be trimmed to the configuration necessary to fit into the housing 20. The pressure of the pressure wave or flame front against the exposed faces 67 will cause the tube to collapse and expose the upstream side of the flapper plate to the pressure wave or flame front.

From the description above, a number of advantages of my Flapper Plate Detonation Flame Arrester become evident. This new configuration will not only stop the flame front, but will also stop the pressure wave associated with both detonations and deflagrations inside piping systems, minimizing the likelihood of loss of life and damage to property as the result of fires and explosions transferred between transportation vessels, fixed storage facilities, processes, environmental, or other connected equipment.

The flapper plates with accompanying flotation trigger mechanisms will shut off liquid flow through vapor piping systems, reducing frequency and severity of spills or fire from overfilling of storage vessels' vapor piping systems.

The fusible links that are attached to spring mechanisms capable of shutting the flapper plates will provide protection against continuous flame fronts by causing the flapper plate to shut, protecting the flame arrester and allowing the flame arrester to be manufactured of less expensive and better suited materials.

The flapper plate activation indicator mechanism will alert personnel of activation by triggering an alarm or other sensing device to alert operators or process controllers of any situation in which a flapper plate has been activated, thus allowing intervention before further deterioration of the system occurs.

By removing the bolts from flange assembly 50 and 52 the flame arrester element can be easily removed for cleaning and repair without removal of the entire device from the system. Once the flame arrester is removed, it will also be easy to inspect, repair, or replace any internal components of the flapper plate detonation flame arrester.

The net free area through the detonation flame arrester element can easily be designed to exceed 1.5 times the cross sectional area of the arrester inlet in order to facilitate minimal pressure drop across the device.

OPERATION OF THE INVENTION

The flapper plate detonation flame arrester is essentially a device designed to provide a barricade, and thereby stop pressure waves, continuous flame fronts, and/or liquid or vapor flow within an inline transportation system which may contain gas or vapors of a flammable nature. The flapper plate device may be triggered by a number of activation methods, depending upon the type of threat presented within the system. The left and right flapper plates 22 and 24 are tightly fitting plates that will cover the entire cross sectional area of the housing structure 20 and 21 when fully slammed shut, resulting in shutdown of the piping system and protecting against progressive deflagration or detonation pressure waves, flame fronts, liquid spills, and other possible undesirable occurrences. Four of these possible ramifications and optional methods of activation are listed and described separately below.

Pressure Wave Activation

Activation method 1 occurs when a closed vessel deflagration or detonation flame front pressure wave propogates in association with the flame front through the attached piping system. In this case, the flapper plate 22 or 24 will be activated and entirely conveyed into the closed position by the force of the pressure wave in association with the flame front. The only function of the torsion springs 26 and 28 in the preferred embodiment and activated in this manner will be to hold the plate in place following activation by the pressure front. The energy associated with such a detonation or deflagration occurrence will also act on the float weight to cause it to move sufficiently, thereby disturbing the float weight/moment arm balance and release the notched moment arm 31, wire 54 and spring 26 to hold plate 22 in its closed position. However, the spring is not necessary for the flapper plate to be activated or effective in this scenario.

Flame Front Activation

Activation method number 2 occurs when a stabilized flame front exposes flame arrester elements to continuous flame. In this case, in the preferred embodiment, the flapper plate 22 or 24 will be activated by means of fusible links forming part of a spring restraining wire 54 or 56 and attached to a torsion spring 26 or 28 which will slam the flapper plate shut within the housing assembly and against the channeled reinforcing barrier 10. Either one of a set (one side) of the two sets of fusible links 34 and 38 or 36 and 40 will melt under conditions of a continuous flame front at 286 degrees Fahrenheit, releasing the spring restraining wire 54 or 56 and activating the spring mechanism 26 or 28 to slam shut the flapper plate 22 or 24. The direction of approach of the flame front determines which set of devices will be activated, although different embodiments may include different methods of activation in the presence of a flame front. Even though the channeled reinforcing barrier when embodied as a flame arrester may be constructed of aluminum or other low melting point materials, upon system activation all gas flow will stop, removing fuel or oxygen or both and causing the stabilized flame front to proceed no further.

Float Release Activation

Activation method 3 occurs when a liquid is present in the system and the float weight release mechanism 30 or 32 is elevated by buoyancy as a result of a liquid accumulating behind the bottom grooved dam plate 16 of the channeled reinforcing barrier. In the preferred embodiment, the dam plate 16 is an extra thick bottom plate of the channeled reinforcing barrier 10 whose thickness is sufficient to back up enough liquid to activate the float weight release mechanism 30 or 32. The float weight release mechanism 30 or 32 will hold a notched moment arm 31 or 33 and spring restraining wire 54 or 56 in place until activated by elevation of the float due to unintended liquid within the housing structure 20 or 21, or until activation of the fusible link or activation by pressure front. The float weight, release mechanism 30 or 32 is supported by a pivot leg 23 or 25 off center and away from the notched moment arm 31 or 33 and is constructed of appropriate material that its size and mass will offset the force moment arm created by the spring restraining wire when connected to its attachment points, the top tie hook 58 or 59 and a hinged post 29 or 27 connected to moment arm 31 or 33 within the housing structure float weight release mechanism 30 or 32, and torsion spring 26 or 28 will result in an optimum weighted float for mechanism activation. However, other embodiments may include different flotation or liquid sensing activation methods.

External Movement Activation

Activation method 4 occurs when the float release mechanism 30 or 32 of activation method 3 is arranged such that the float weight 30 or 32 swivels about pivot leg 23 or 25 as a result of a physical disturbance of the flame arrester such as by earthquake, which will allow the notched moment arm 31 or 33 to become free of float weight release mechanism 30 or 32 allowing the spring restraining wire to be released and thus activating either or both flapper plates by means of left torsion spring 26 or right torsion spring 28.

Thus, it can be seen that the flapper plate detonation flame arrester is an efficient and effective means of preventing fires and explosions resulting in injuries, deaths, and property loss in vapor recovery and other piping systems containing vapors of flammable or combustible liquids. It also is economical relative to existing technology and can help prevent liquid spills due to overfilling and other causes.

While the description includes many specificities, these should not be interpreted as limitations to the scope of the invention. The specificities should rather be considered illustrations of one preferred embodiment of the invention. Many other variations are possible. Modifications to the device could allow appropriate system shutdown under these and other such conditions, or serve as secondary emergency shutdown through manual or automatic means in emergency situations. Accordingly, the scope of the invention should be determined not by the embodiment illustrated, but by the appended claims and their legal equivalents.

I claim:

1. A flapper plate detonation flame arrester comprising:
   a housing comprising first and second housing assemblies, said housing assemblies fastened together;
   first and second flapper plates, each of said plates responsive to a propagating pressure wave passing through said housing assemblies to pivot from an open position to a closed position, disposed one in each of said housing assemblies and each flapper plate positioned at such an angle as to be forced to said closed position by a detonation or deflagration pressure wave advancing toward and into one of said housing assemblies from a piping system to which said housing assemblies are connected, for stopping flow of fluids through said housing assemblies; and
   a channeled reinforcing barrier constructed and arranged for permitting flow of gas between said first and second housing assemblies and disposed intermediate said first and second flapper plates providing a stop surface for the flapper plates to slam against.

2. The detonation flame arrester of claim 1 wherein said channeled reinforcing barrier comprises a stacked plate flame arrester.

3. The detonation flame arrester of claim 1 further comprising an activation means disposed within each said housing assembly for closing at least one of said flapper plates against said barrier.

4. The detonation flame arrester of claim 3 wherein said activation means comprises a spring biased restraining wire and a spring means held in position by said spring biased restraining wire for supporting each of said flapper plates for movement from an open position to a closed position in response to said pressure wave, said restraining wire further provided with at least one fusible link such that a stable flame contacting the channeled reinforcing barrier will melt the fusible link releasing at least one of said spring means to shut at least one of said plates.

5. The detonation flame arrester of claim 3 wherein said activation means comprises a spring, a float weight and a notched moment arm releasably held in position by said float weight, a spring restraining wire passing partially around said notched moment arm and attached to said spring, whereby liquid entering the piping system and accumulating behind said channeled reinforcing barrier releases said float weight through buoyancy of the float weight thereby releasing said notched moment arm freeing said restraining wire and said spring, effecting closing said flapper plate.

6. The detonation flame arrester of claim 3 wherein said activation means comprises a spring means and a restraining wire restraining said spring means, a release means for detecting movement of said detonation flame arrester and responsive to said movement for releasing said spring means, whereby a movement of said arrester is detected releasing said restraining wire thereby further releasing said spring means to shut said flapper plate.

7. The detonation flame arrester of claim 6 wherein said release means for detecting movement comprises a weight and a moment arm restrained by said weight, said weight moveable with respect to said detonation flame arrester upon movement of said detonation flame arrester, thereby releasing said moment arm, said restraining wire and said spring means for movement.

8. A flapper plate detonation flame arrester for a closed piping system comprising:
   a pair of housing shells, each of said housing shells comprising means for joining with the other housing shell, for forming a chamber and means defining a first opening in each of said housing shells for the passage of gaseous material;
   said means for defining a first opening further comprising means for attaching said housing shells to a piping system;
   said means for joining defining a second opening in each said housing shell;
   a pressure wave pivotable flapper plate disposed within each of said housing shells and disposed in a first position pivotally withdrawn from said means for joining and moveable from said first position to a second position to close said second opening defined by said means for joining, one of said flapper plates responsive to a pressure wave within said piping system propagating through said chamber to move from said first position to said second position;
   a channeled reinforcing barrier permitting passage of gases from one of said housing shells to said other one of said housing shells and disposed between said flapper plates for at least partially supporting said one of said flapper plates when said one of said flapper plates is disposed in said second position in response to said pressure wave, said one of said flapper plates responsive to said pressure wave disposed on a side of said barrier from which said pressure wave propagates toward said flame arrester.

9. The flapper plate detonation flame arrester of claim 8 wherein said channeled barrier means comprises a plurality of plates disposed to form channels therebetween, said channels communicating from a first side of said barrier to a second side of said barrier.

10. The flapper plate detonation flame arrester of claim 9 further comprising an activation means disposed interior to said detonation flame arrester, for closing at least one of said flapper plates responsive to elevation of temperature within said housing shells.

11. The flapper plate detonation flame arrester of claim 10 wherein said activation means comprises a spring means for forcing said flapper plate against said barrier means and a fusible link restraining said spring means, and said activation means responsive to a temperature necessary to melt said fusible link, for releasing said spring means.

* * * * *